Dec. 8, 1959  J. M. FURFORD  2,915,871
CRANBERRY PICKING AND PRUNING MACHINE
Filed Oct. 22, 1957  3 Sheets-Sheet 1

JULIUS M. FURFORD
*INVENTOR.*

BY *Smith & Tuck*

Dec. 8, 1959 J. M. FURFORD 2,915,871
CRANBERRY PICKING AND PRUNING MACHINE
Filed Oct. 22, 1957 3 Sheets-Sheet 2
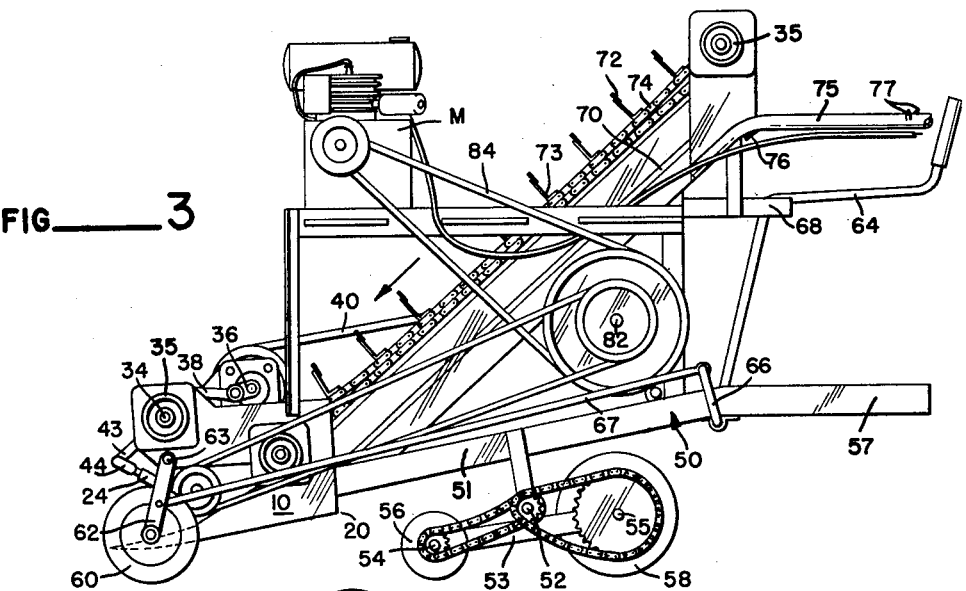
JULIUS M. FURFORD
INVENTOR.
BY Smith & Tuck

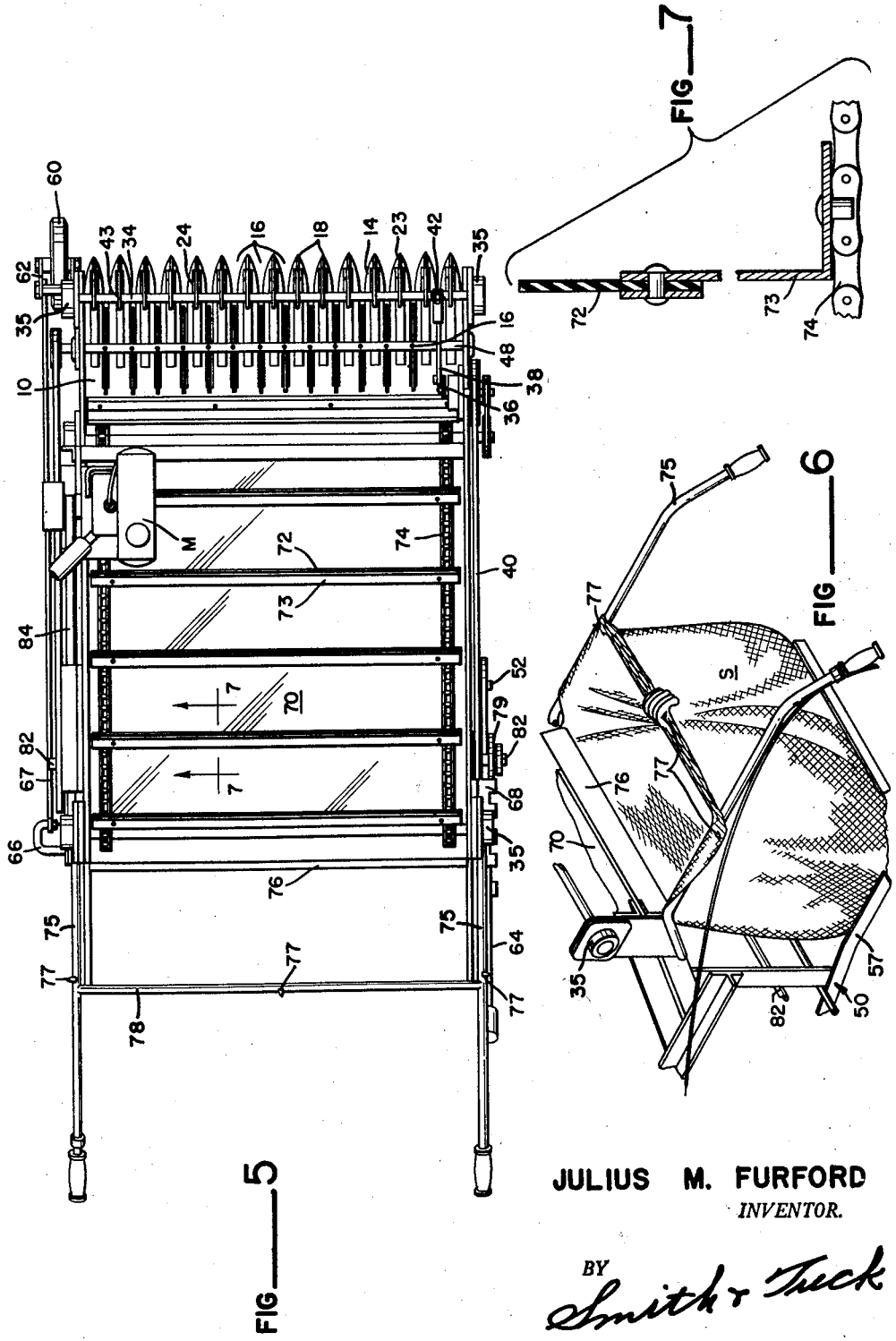

United States Patent Office 2,915,871
Patented Dec. 8, 1959

2,915,871

CRANBERRY PICKING AND PRUNING MACHINE

Julius M. Furford, Grayland, Wash.

Application October 22, 1957, Serial No. 691,740

4 Claims. (Cl. 56—330)

This present invention relates to the general art of power driven harvesting machines and more particularly to a machine which is especially constructed and proportioned to harvest cranberries and to at the same time cut the upstanding bushes which are not wanted. This machine is comparable in its handling to a two wheeled wheelbarrow or cultivator where the operator walks behind the machine and adjusts it to conditions as the machine moves over the ground by power supplied by its own internal combustion engine. The picking device itself acts to comb the berries off of the fruit producing tips of the vines. The berries and prunings are then engaged by a vertical elevator that moves them up an incline and finally deposits them in a receptacle or sack toward the rear of the machine.

In the past a number of machines have been provided for the purpose of picking cranberries but those that have been observed do not provide the adjustability under the immediate control of the operator to a degree where the machine can be immediately readjusted to varying conditions. The cranberry bogs where cranberries are grown commercially have irregular ground surfaces and then the bushes grow more densely in certain areas than others and this calls for convenient adjusting means that can be quickly actuated to adapt the picker to widely varying conditions. It is believed that this present machine fully meets the exacting requirements of a successful cranberry picking machine.

The principal object of this present invention is to provide a comb-like picking arrangement for picking cranberries so they may be handled in a manner to prevent bruising or crushing the berries.

A further object of this present equipment is to provide means so that the picking comb of this machine can be very quickly adjusted to varying conditions in a cranberry bog to the end that all the berries can be harvested in one passage of the machine.

A further object of this invention is to provide means whereby the larger vines that are non-productive and are normally upstanding, will be engaged by pins which are power driven in a vertical plane above the comb means so that the unproductive vines will be carried down into a cutter where the vines will be sheared as they have no practical value.

A further object of this invention is to provide adequate mechanical means for the sorting of the vines that are no longer productive from the fruit tips where the cranberries actually grow, the vines being cut while the berries are being stripped from the berry producing tips.

Further objects, advantages and capabilities will be apparent from the description and disclosure in the drawings, or may be comprehended or are inherent in the device.

In the drawings:

Figure 3 is a side elevation of a cranberry machine made after the teachings of this present invention.

Figure 4 is an enlarged bracketed, perspective view illustrating, in fragmentary form, with parts shown in section the resilient comb member, the vine cutting or shearing members and the means employed for insuring that the upstanding vines are carried into the clipping recess.

Figure 5 is a top plan view of this cranberry picking machine.

Figure 6 is an enlarged fragmentary perspective view in which the handle bars, the sack supporting means are shown.

Figure 7 is an enlarged fragmentary bracketed sectional elevation view through the conveyor means employed to move the cranberries and clipped vines up to the rear of the machine, taken along the line 7—7 of Figure 5.

Figure 1:
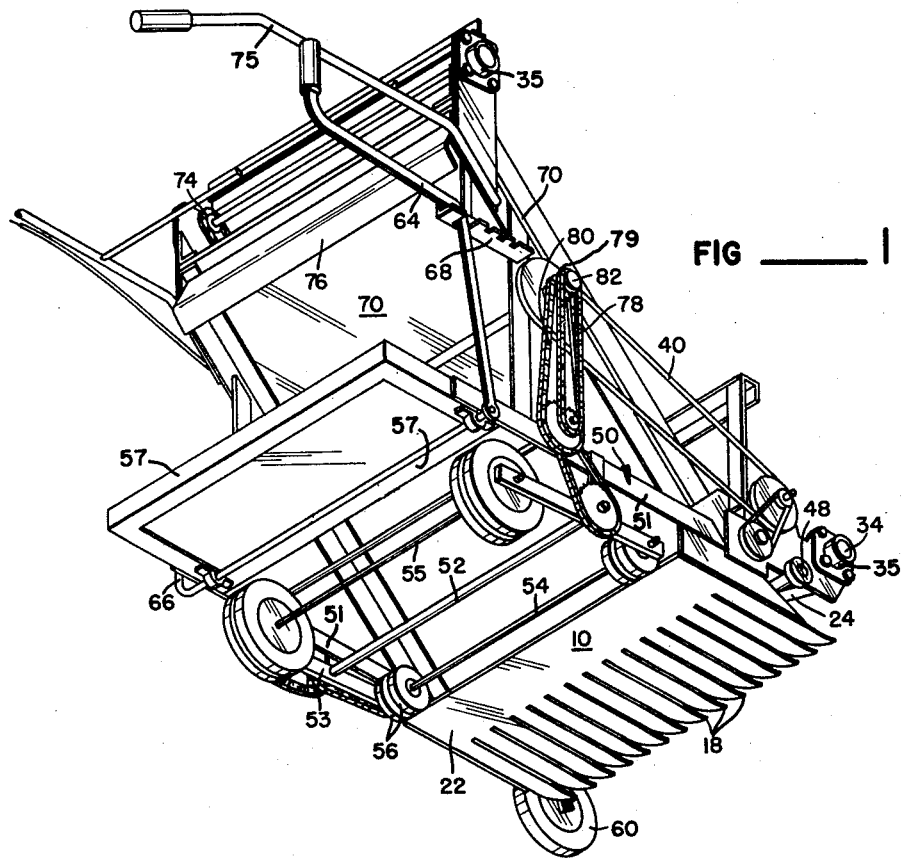
Figure 1 is a perspective view showing the underneath or ground engaging surface of my cranberry picking machine.

Referring to the drawings, throughout which reference characters indicate like parts, the numeral 10 designates the berry picking comb of the machine. This member is formed of a metal plate in which a large number of slots are formed as indicated at 12. These slots produce in effect a plurality of teeth and the width of the slots 12 should be sufficient so that they will pass the cranberry vine tips through between the teeth but will be narrow enough so that they wil also strip the mature cranberries from the tips. Referring to Figure 1 and particularly Figure 4 it will be noted that the individual teeth as 14 are pointed and this give a relatively deep V shaped opening 16 so that because of the points 18 and this relatively wide V the vines and tips will be directed into the relatively long narrow slots 12. The comb unit as an entirety is disposed at a slight angle to the ground so that the rear portion indicated at 20 in Figure 3 will be somewhat elevated from the points and this makes it possible to more conveniently strip the berries from the tips and have the tips pass out through the slot and be engaged by the unslotted rear portion 22 of the comb. The rear portion preferably has considerable width along the longitudinal axis of the machine so that it will act as a pressure member and will tend to hold the vines close to the ground and thus not damage the new fruit bearing tips. In order that the teeth will be yieldable but have adequate strength it is preferred that they be made of relatively thin metal plate and be longitudinally reinforced as by ribs 23.

In the culture of cranberries it is not possible commercially to spend the time to actually control the direction of the cranberry vines nor to prune the same in the sense of pruning them as a separate operation. It is, however, very desirable that the non-fruit bearing vines which tend to grow up and above the berry producing tips should be removed so as to give the tips more growing space and to further make it more convenient to pick the berries when they mature. In this present equipment a plurality of rectangular tubes 24 are provided, inclined upwardly and forwardly at approximately 45° with the horizontal, and secured at their lower ends 26 to the tines 14. Disposed for reciprocation within tube 24 is the shear member 28. This structure is best shown in Figure 4 and it will be noted that a slot is cut into 24 at 30 which creates two closely spaced shear edges and these edges coact with the lower end of end 32 of shear member 28 so that a true shearing action is obtained at this point as the edges of the lower end 32 are forced past the edges formed by slot 30. Member 28 of course must be withdrawn from slot 30 in order to permit the entry of the vine which at this point will be substantially horizontally disposed. The reciprocation of member 28 is accomplished by it having a drive shaft 34 which oscillates or makes a partial revolution due to the fact that it is driven by an arm 36 and a connecting rod 38 which is pivoted in any suitable manner of the arm 42 which is secured to shaft 34. Crank 36 is driven by means of a drive belt 40 indirectly from motor M. A plurality of suitable bearings 35 are provided so as to maintain the position of shaft 34. To shaft 34 are secured arms 43 which in turn are connected to shear members 28 by means of a link 44. This link is essential in order to take care of the displacement of the upper pivot 45 as it swings in an arc about the center of shaft 34.

Shear tube 24 has a secondary purpose in that it acts as a guide means to engage vines near its upper end and then to guide them down to the shearing slot 30. The actual movement of the vines, however, is accomplished by a plurality of pins 46 which extend radially from a driven rotary shaft 48, there normally being one set of pins disposed between the various shear members 22—28. These pins 46 actually engage the vines and move them rearwardly and because they are guided by tube 24 the vines are carried down and engage slot 30 and enter the same when shear member 28 is in its raised position. As it comes down the shearing of the vine is accomplished and the sheared vine portion is carried upwardly by conveyor means to be described and deposited in the sack normally along with the picked berries.

This machine is provided with a main frame 50 formed of two spaced apart longitudinal members 51 with appropriate transverse members 57 at the rear of the machine and the comb 10 at the front of the machine. At a point substantially under the center of mass of the entire unit is a pivot shaft 52 which is also power driven from motor M by means of a plurality of chain or belt drives. Pivoted about shaft 52 are two longitudinally disposed frame members 53 which are connected together at each end by rotary shafts 54 and 55. These shafts are preferably journalled within the end members so that the spaced wheels 56 and 58 may be secured to the shaft and driven thereby. Normally over-riding clutch means are provided in the wheels to facilitate making turns of the machine with ease. Clutch members of this order are common and are not specifically illustrated. Owing to the fact that the forward portion of frame 50 is sloping it has been found desirable to provide wheels 56 and 58 of different diameters and this requires appropriate sprockets so that the chain drive will drive both at the same peripheral speed. The fact that the two sets of wheels are pivoted about shaft 52 of course gives greater bearing and greater stability and yet when one axle passes over a rise or depression in the ground it only moves the machine itself one-half the distance because of the two axle arrangements. This has proved to be very desirable in a machine of this order which must operate on ungraded ground.

In order to provide a downward limit stop for teeth 14 a gauge wheel 60 is provided. This wheel is supported from pivoted arms 62 which pivot at 63 and are controlled by lever 64 through means of the transverse shaft 66 and the connecting rod 67. A ratchet plate may be provided to provide definite setting and this will be noted at 68 in Figure 1.

Figure 2:
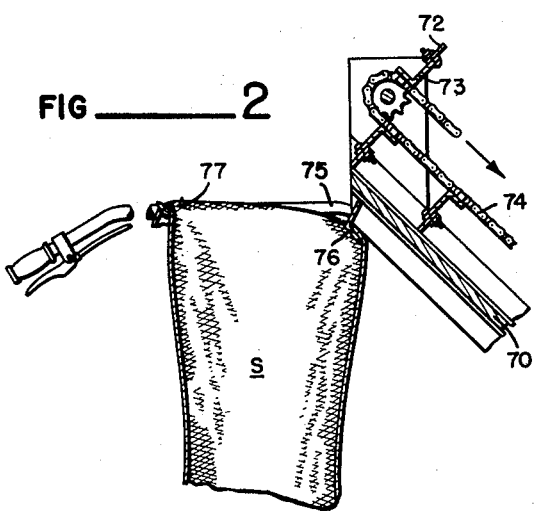
Figure 2 is a fragmentary enlarged view showing the control handle bar together with a portion of the conveyor and the sack supporting means into which the berries are deposited by the conveyor.

As the berries are stripped from the tips they are deposited on an upwardly sloping plate 70 which is wiped by the resilient transversely disposed bars 72. These bars, normally of neoprene or like material are fixedly secured after the showing of Figure 7 to angle members 73 which in turn are secured as link attachments to the elevator chain 74. In Figures 2 and 6 the upper end of the conveyor is illustrated together with the means for holding the berry collecting sack S. One convenient means is to employ a transversely disposed angle member 76 on the forward edge of the sack and then a plurality of points 77, spaced about the supporting rim formed of angle 76, the spaced operator's guiding handles 75 and the transverse rod 78, to the end that the sack will always be right in front of the operator and he can watch that none of the clipped vines interfere with the flow of the cranberries into the sacks and further no appreciable time will be spent in changing from the filled sack to a new empty one.

The exact manner in which the power is distributed from motor M to the various essential parts is not critical and one workable arrangement will be observed in Figures 1 and 3. It has been found desirable to provide a two speed drive means for wheels 56 and 58 and this may be achieved rather simply by means of jaw clutches engageable by a shiftable member 79 disposed between the two chains as 78 and 80 wherein sprockets of different ratios are employed on the two shafts with clutching means so that the desirable ratio can be selected. The uppermost of these two shafts as 82 may be considered the main power shaft which is directly driven from motor M as by belt 84. From shaft 82 by using sheaves or pulleys of suitable diametrics for either chains or belts it is possible to easily achieve the drive speeds that any particular localities may require because of their local conditions.

It is believed that it will be clearly apparent from the above description and the disclosure in the drawings that the invention comprehends a novel construction of cranberry picking and pruning machine.

Having thus disclosed the invention, I claim:

1. A cranberry picking and pruning machine, comprising: a substantially horizontal framework; a pivot and drive shaft disposed transversely of and secured to said framework and at substantially the balance point of the machine; longitudinally disposed frame members pivoted near their center on said drive shaft; traction shafts having machine supporting and traction wheels, secured in driving relationship thereto and revolvably supported at opposite end of said frame members; drive means connecting said pivot and drive shaft and said traction shafts; a berry picking comb, comprising a metal plate secured transversely at the front of said framework; said plate having slots opening at the leading edge of the plate and disposed longitudinally of said framework; a gauge wheel, pivotably secured near the front end of said comb, and adjusting and locking means to insure a minimum height for said comb above the ground when in use; a plurality of rectangular tubes secured at their lower ends to the top of said comb and having shear slots near their lower ends; a plurality of shear members disposed for reciprocation within said tubes and adapted to coact with said shear slots to shear off berry vines presented to them; power means for reciprocating said shear members; a power driven revolvable shaft disposed rearwardly of the approximate mid point of said rectangular tubes and having radially disposed rods adapted to revolve between said tubes and carry the vines to be cut, downwardly to engage said shear slots; inclined conveyor means having its lower end positioned to accept the picked berries and vine prunings and carry them upwardly to a collecting container carried by the machine and a prime mover operatively connected to the traction wheels and to the power driven elements of the machine.

2. A cranberry picking and pruning machine, comprising: a substantially horizontal framework having handle bar directing means secured to the rear end thereof; a pivot and drive shaft disposed transversely of and secured to said framework and at substantially the balance point of the machine; longitudinally disposed frame members pivoted near the center on said drive shaft; traction shafts having machine supporting and traction wheels, secured in driving relationship thereto, and revolvably supported at opposite end of said frame members; flexible drive means connecting said pivot and drive shaft and said traction shafts; a berry picking comb, having slits in the leading edge of a metal plate, said plate secured near the front of said framework; a guage wheel, pivotably secured near the front end of said comb, and a locking lever with connecting means to said guage wheel and a coacting notched quadrant secured to said framework in a manner to insure a minimum height for said comb above the ground when in use; a plurality of rectangular tubes, angularly disposed parallel to the longitudinal axis of the machine with their tops displaced forwardly, secured at their lower ends to the top of said comb and having shear slots near their lower end; a plurality of shear members disposed for reciprocation within said tubes and adapted to coact with said shear slots to shear off berry vines presented to them; power means for reciprocating said shear members a power driven revolvable shaft disposed rearwardly of the approximate mid point of said rectangular tubes and having radially disposed rods adapted to revolve between said tubes and carry the vines to be cut downwardly to engage said shear slots; inclined conveyor having its lower end positioned to accept the picked berries and vine prunings and carry them upwardly to a collecting container and a prime mover operatively connected to the traction wheels and to the power driven elements of the machine.

3. A cranberry picking and pruning machine, comprising: a substantially horizontal framework and a sloping framework joined together adjacent the front end of said machine and in spaced apart relationship at the rear of said machine; a power driven pivot shaft secured beneath said horizontal framework at substantially the point of longitudinal balance; spaced apart longitudinally disposed frame members pivotably supported by said pivot shaft and connected together at their front and rear ends by transverse rotary shafts driven by said power driven pivot shafts; spaced pairs of wheels secured to said rotary shafts and adapted to support and propel said machine; a cranberry stripping comb secured to the forward portion of said horizontal framework; a guide wheel, disposed for manual height adjustment, for said comb to control the height of the comb above the ground as the machine moves over uneven ground; a shear for cranberry stems having a plurality of fixed, upwardly sloping rectangular tubes disposed parallel to the longitudinal axis of said machine and coacting, power reciprocated shear members mounted for movement within said tubes, slots near the lower ends of said tubes to provide shear edges and to admit the cranberry stems into shearing position; said slots aligned transversely of said machine; a plurality of radially disposed pins secured to a transversely disposed rotary shaft and adapted to feed said stems into said shear; an elevator disposed on said sloping framework to accept the sheared stems and berries and elevate them to a container carried on said machine and a prime mover for powering said machine.

4. A cranberry picking and pruning machine, comprising: a substantially horizontal framework and a second framework sloping downwardly to the front end of said machine; structural means for fixedly joining said frameworks together; a power driven pivot shaft secured beneath said horizontal framework; spaced apart longitudinally disposed frame members pivotably supported by said pivot shaft and connected together at their front and rear ends by transverse rotary shafts driven by said power driven pivot shaft; spaced traction wheels secured to said rotary shafts and adapted to support and propel said machine; a cranberry stripping comb secured to the forward portion of said horizontal framework; means bearing on the ground and adjustable with respect to said comb to vary the height of the comb above the ground as the machine moves over uneven ground; means for shearing said cranberry stems into a number of short pieces; said shearing means comprising a plurality of shears adapted to accept said stems in a horizontal position, transversely of said machine; a power driven rotary shaft disposed transversely of said framework and carrying radially positioned pins for feeding said stems into said shearing means; an elevator disposed on said sloping framework adapted to accept the berries and elevate them to a container carried on said machine; a prime mover for powering said machine and power transmission means operatively joining said prime mover and the various drive shafts of said machine.

References Cited in the file of this patent

UNITED STATES PATENTS

| | | |
|---|---|---|
| 1,608,069 | Lacey et al. | Nov. 23, 1926 |
| 1,907,467 | Tervo et al. | May 9, 1933 |
| 2,320,317 | Wilson | May 25, 1943 |
| 2,459,471 | Tebbetts | Jan. 18, 1949 |
| 2,607,180 | Stankavich et al. | Aug. 19, 1952 |